(12) United States Patent
Cronk et al.

(10) Patent No.: US 8,456,646 B2
(45) Date of Patent: Jun. 4, 2013

(54) VISION RECOGNITION SYSTEM FOR PRODUCE LABELING

(75) Inventors: Stephen Cronk, Arundel (GB); Jason Dale, Surrey (GB); Phillip Holland, Norwich (GB); Richard Hawkes, Norwich (GB)

(73) Assignee: Sinclair Systems International LLC, Fresno, CA (US)

( * ) Notice: Subject to any disclaimer, the term of this patent is extended or adjusted under 35 U.S.C. 154(b) by 0 days.

(21) Appl. No.: 13/199,876

(22) Filed: Sep. 12, 2011

(65) Prior Publication Data

US 2012/0069354 A1    Mar. 22, 2012

Related U.S. Application Data

(60) Provisional application No. 61/403,272, filed on Sep. 13, 2010.

(51) Int. Cl.
*G01B 11/30* (2006.01)
(52) U.S. Cl.
USPC .......................................... 356/612; 356/601

(58) Field of Classification Search
USPC ...................... 356/601–613, 52–67
See application file for complete search history.

(56) References Cited

U.S. PATENT DOCUMENTS

| | | | |
|---|---|---|---|
| 4,790,660 A * | 12/1988 | Ito et al. ......................... | 356/607 |
| 5,791,497 A | 8/1998 | Campbell et al. | |
| 6,219,438 B1 | 4/2001 | Giordano et al. | |
| 7,153,378 B2 | 12/2006 | Sleiman et al. | |
| 7,161,688 B1 | 1/2007 | Bonner et al. | |
| 7,168,472 B2 | 1/2007 | Hirst et al. | |

* cited by examiner

*Primary Examiner* — Tri T Ton
(74) *Attorney, Agent, or Firm* — Bruce H Johnsonbaugh

(57) ABSTRACT

A vision recognition system is provided for use with a high speed, automatic produce labeling machine. The system uses laser profiling to direct a sheet of light transversely to the longitudinal axis of a produce feed conveyor. The sheet of light periodically impacts, and generates laser profiles of, the surfaces of the produce items, such as pears, being fed by the conveyor to one or more labeling machines. The laser profiles are used to generate real world (x,y) coordinates of the domes of the incoming produce items, which are passed to the labeling machine or machines. Real world height (or z) coordinates may also be created and passed to the labeler.

6 Claims, 5 Drawing Sheets

VISION RECOGNITION SYSTEM FOR PRODUCE LABELING

CROSS REFERENCE TO RELATED APPLICATION

This application claims the benefit of and priority from U.S. provisional application Ser. No. 61/403,272 filed Sep. 13, 2010.

BACKGROUND

The present invention pertains to automatic, high speed produce labeling machines. More particularly, the present invention provides a technique for increasing the labeling speed while maintaining a high efficiency of operation. The efficiency of operation includes the proper placement of labels on produce items as well as placing labels on all produce items presented to the automatic labeling machine. There is a constant demand for higher speed labeling systems, provided that the efficiency of label application is not reduced at higher speed. By way of background, such automatic labeling machines typically apply 720 labels per minute per labeling head to produce items approaching the labeler at speeds of about 75 meters per minute.

Previous attempts to scan incoming produce items to provide "advance data" to the automatic labeler regarding location of those items on the conveyor have been attempted. All such prior systems known to the applicant(s) have been sensitive to, and scanning results affected by color variables such as changes in produce variety, produce color, tray liner color and tray liner material color. Color variations affected the system performance significantly, and limit the speed and efficiency of those systems.

The present invention provides a system in which the color variables of the produce item, carrying tray and various items such as straw that occasionally appear in the trays, do not affect the performance of the system.

BRIEF SUMMARY OF INVENTION

The present invention, for the first time known to the applicant(s), utilizes a laser profiling system to repeatedly scan the produce items moving on a conveyor at high speed toward the labeling machine. The laser profiling system provides "advance data" to the labeling machine regarding the location and preferably also the size (or height) of the fast moving produce items. This "advance data" is used instantaneously by the labeling machine to anticipate when and where to place labels on those produce items.

The present invention uses laser (or other high intensity light source) profiling to identify the horizontal or (x, y) location of produce items in a tray or on a conveyor belt as the items approach the labeler. The present invention, in a preferred embodiment, also uses laser profiling to identify the size, or height, of produce items (on a z axis). The height of produce items is related to the brightness of the image, as described below. The laser profiling produces "real world" (x, y, z) coordinates that are passed to the labeler at high frequency and instantaneously. We have found that, as a practical matter, for a given tray carrying multiple produce items, such as pears for example, the only z or height coordinate passed to the labeler is the coordinate for the maximum height for that given tray. Alternatively, all z or height coordinates may be passed to the labeler; the labeler can then be programmed to respond only to the maximum height in the given tray or to respond to two or more different heights in any given tray. Once the labeler knows the coordinates of the approaching produce items, labeling speeds can be increased without a loss of labeling efficiency.

As noted above, the present system differs from the prior art known to applicant(s) in that it is not sensitive to, or adversely affected by, color changes or color variables in any of the objects being scanned; i.e. produce items, carrying trays and detritus in those trays.

One object of the invention is to provide a laser (or other high intensity light source) profiling system to provide real world horizontal (x,y) coordinates locating the instantaneous position of the domes of produce items as they approach an automatic high speed labeling machine.

A further object of the invention is to utilize a laser profiling system to provide real world (x, y, z) coordinates locating the instantaneous position and height of the domes of produce items as they approach an automatic, high speed labeling machine, which system is unaffected by color variables occurring in the produce items, carrying trays, and detritus in the carrying trays.

A further object of the invention is to increase the speed of automatic produce labeling machines while maintaining the efficiency of those machines in accurately applying the labels.

DETAILED DESCRIPTION OF THE DRAWINGS

Figure 1:
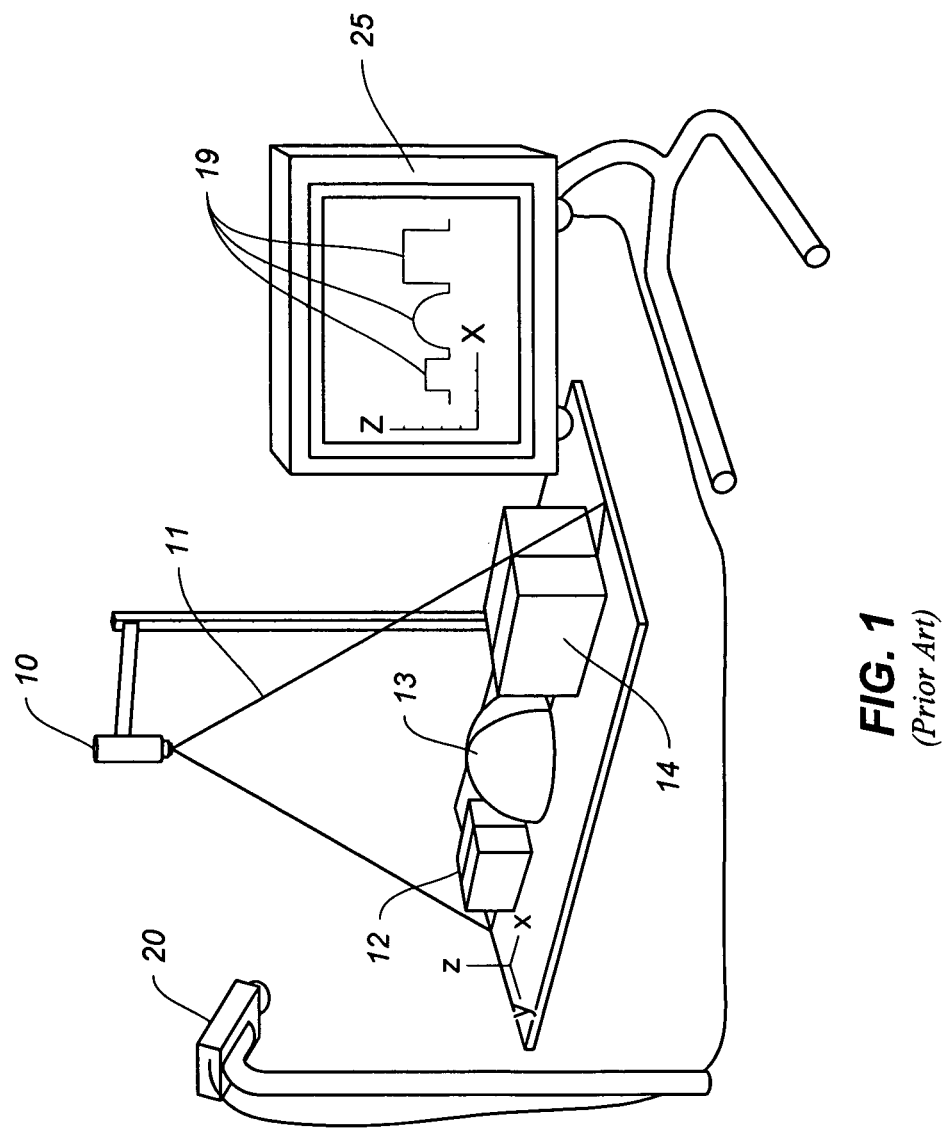
FIG. 1 is a schematic illustration showing how the laser profiling technique may be used to obtain height (or z axis) information of various objects.

As shown in FIG. 1, laser profiling involves the projection of a light pattern from a laser 10, usually a plane, at a known angle onto an object or objects 12, 13, and 14. This technique is used in machine vision for imaging and acquiring dimensional information.

The light pattern is generated by fanning out a light beam into a planar sheet-of-light 11. When sheet-of-light 11 intersects with an object, a bright line of light can be seen on the surface of the object. By viewing this line of light from an angle with a camera 20 the observed distortions in the line can be translated into height variations 19 shown on monitor 25.

Figure 2:
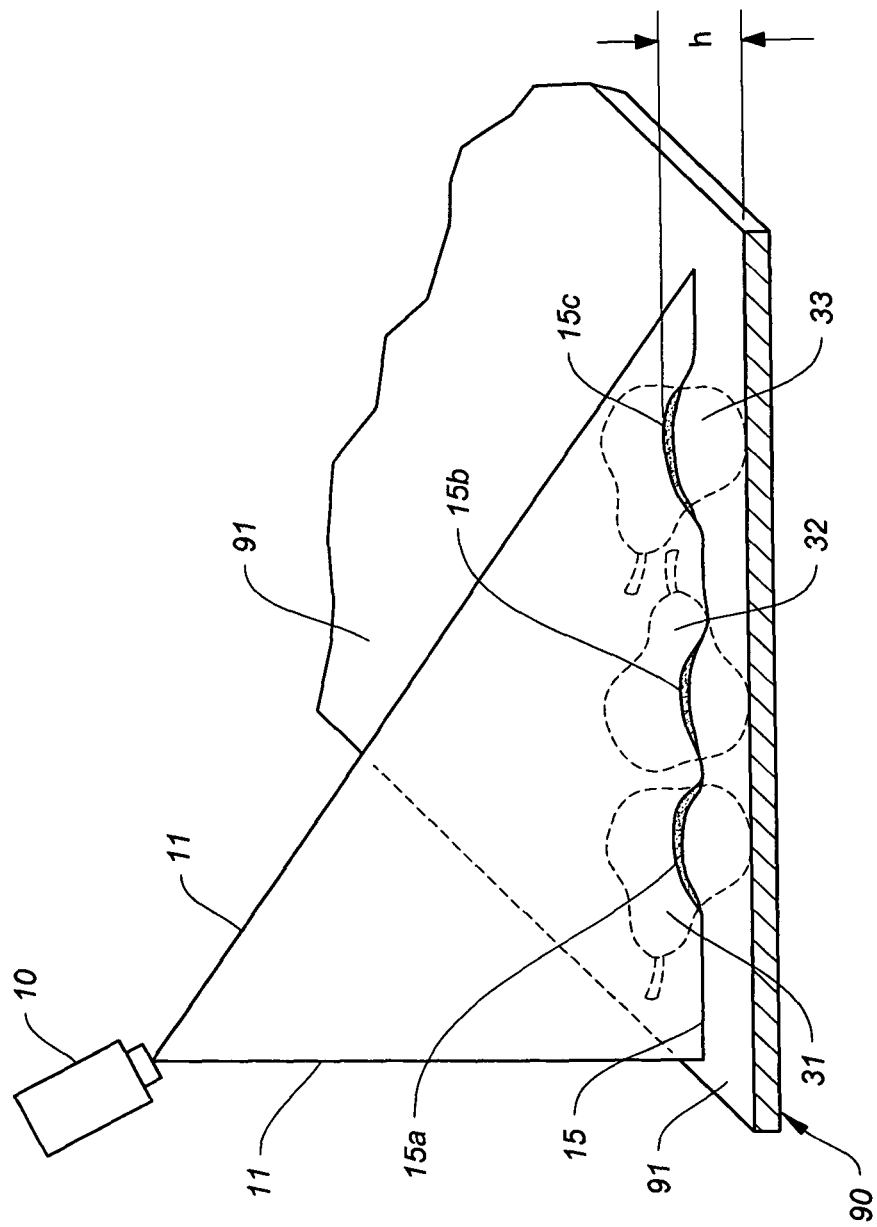
FIG. 2 is a schematic illustration showing how laser profiling is used in the invention to obtain instantaneous height (or depth) information for a row of produce items such as pears.

FIG. 2 is an example of an instantaneous single laser profile image of three pears 31-33. The image shown in FIG. 2 includes a laser profiling line 15 that represents the intersection of a laser "sheet-of-light" (see FIG. 1, item 11) with the surfaces of three pears 31-33, the outlines of which are shown in phantom (or dotted lines) in FIG. 2. In FIG. 2, the laser "sheet-of-light" 11 momentarily intersects the shoulders or sides of pears 31-33 and forms bright lines 15a, 15b and 15c on pears 31-33 respectively. The vertical position h, of profiling line 15 represents the height of the pear surface above the conveyor surface at that particular point where the "sheet-of-light" intersects the pear surface. The "sheet-of-light" output 11 is caused to periodically and at frequent intervals impact the surfaces of the produce items to create instantaneous laser profiles of those surfaces.

The most desirable portion of the surface of each produce item on which to place a label is the highest region, or "dome", of each produce item. The "dome" is the flattest surface which most easily accepts an adhesive label, and which reflects more of the sheet-of-light 11 than any other portion of the surface of the pear. The "dome" is also the highest surface, which requires the minimum travel (and minimum time) for the labeling machine head to apply any given label.

As shown in FIG. 2, conveyor 90 has a flat upper surface 91 on which produce trays (not shown in FIG. 2) carry an array of produce items toward a high speed labeler. No produce tray is shown in FIG. 2 for clarity.

Each of pears 31-33 has a dome portion of its surface respectively which occurs at the greatest height of said pear above the upper surface 91 of conveyor 90.

Figure 3:
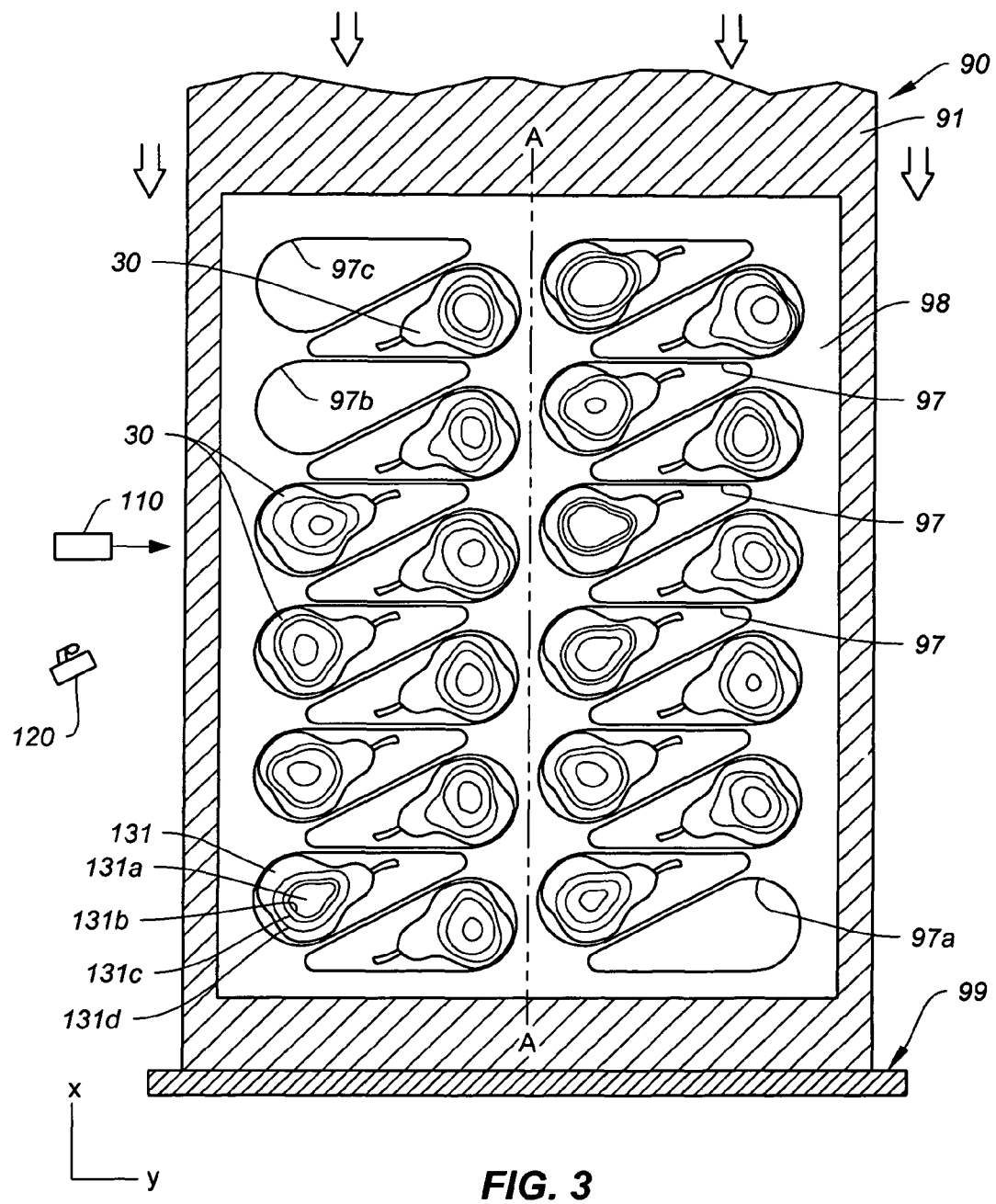
FIG. 3 is an instantaneous image looking downwardly at a tray of pears, wherein the brightness of reflected light corresponds to height.

FIG. 3 is a two dimensional image showing the "real world" horizontal or (x,y) coordinates for an array of 21 pears shown generally as 30 carried in a tray 98 having 24 receptacles shown generally at 97. The pears 30 are moving toward labeling machine 99 along the longitudinal axis A-A of conveyor 90. Conveyor 90 has a flat surface 91. The receptacles 97 cradle each of the pears 30. Cradles 97a, 97b and 97c are empty and carry no pears. The laser and camera are not shown for clarity.

A single pear 131 will be described. The dome 131a of pear 131 is a generally flat and smooth surface bounded by a generally oval ring 131b. Rings 131b, 131c and 131d are essentially contour or topographic rings showing the shape of the upper half of pear 131. It is significant to note that the region between rings 131b and 131c reflects less light and appears darker than the dome 131a. Similarly, the region between ring 131c and 131d reflects even less light and appears even darker. The relative brightnesses of light reflected from the different portions of the surface of each pear are used to locate the dome of each pear and create (x,y) coordinates for each dome.

An important aspect of the invention is to utilize the laser profiling technique to locate the positions of the "domes" of incoming produce items and to give the labeling machine "advance notice" of the real world coordinates of those "domes".

The laser 110 and camera 120 are shown schematically in FIG. 3. The sheet-of-light (not shown for clarity) generated by laser 110 is preferably oriented perpendicularly to axis A-A, but other orientations transverse to axis A-A can be utilized. The laser 110 and camera 120 may be mounted directly over conveyor 90 or off to the side of conveyor 90 as shown in FIG. 3.

The camera lens, sensor resolution and view point are optimized to image produce trays stacked up to three high with sufficient height resolution to recover coordinates to within an accuracy typically <3 mm. The sensitivity of the sensor and brightness of the laser are optimized to ensure operation with fruit that is very dark and non-reflective to red laser light. Every laser profile image (FIG. 2) provides positional information for a single line across the tray. As the tray progresses along the conveyor, images are continuously taken at a very high frame rate in order to build up a complete depth map of the tray.

FIG. 3 is a resulting depth map, and is a 2-D image, with height encoded as relative grayscale brightness with each dome having the greatest brightness, and the surface areas of each pear have a lower relative brightness the further they are below the dome. Positions of fruit and empty tray locations can be measured from the depth image, since fruit has a characteristic "domed" height profile as shown in FIG. 3. The depth image produces a result that is relatively unaffected by typical problems associated with conventional imaging. Depth images in the present system are relatively unaffected by:

Lack of color contrast between the fruit and tray (e.g. green apples on a green tray)

Lack of brightness/luminance contrast between the fruit and tray (e.g. dark plums on a dark tray)

Problematic tray materials (reflective and semi-transparent trays etc)

Trays packed with material such as straw or other detritus.

In order to produce useful height or z coordinates, the system must be calibrated to convert positions in the depth image into real-world (x,y,z) coordinates that the labeling system can use. Primarily, the positions of detected fruit in the image must be converted into world coordinates. This involves the transform of pixel positions (x,y) and grayscale brightness (g) into world (x,y,z) millimeters relative to the position of a detected tray.

Figure 4A:
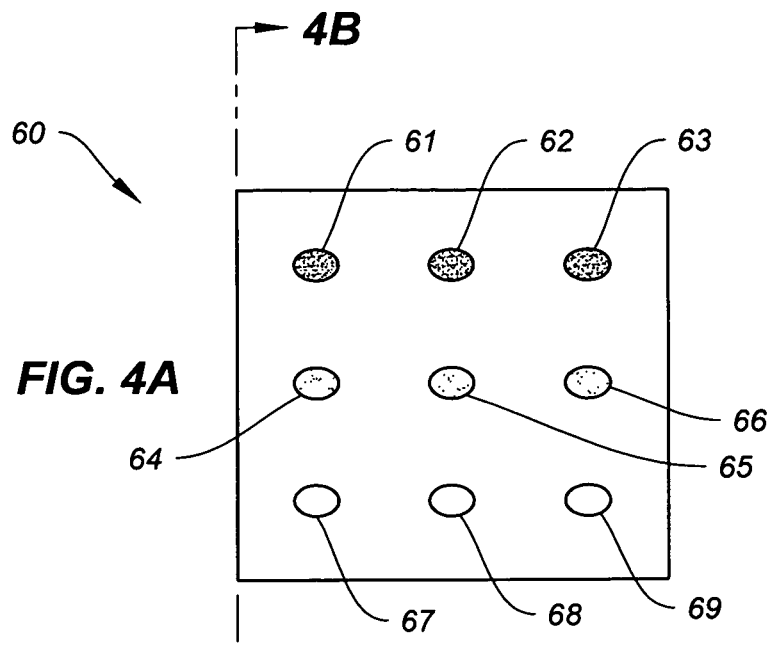
FIG. 4 illustrates a calibration target used to transform an image position into real world (x, y, z) coordinates.
Figure 4B:
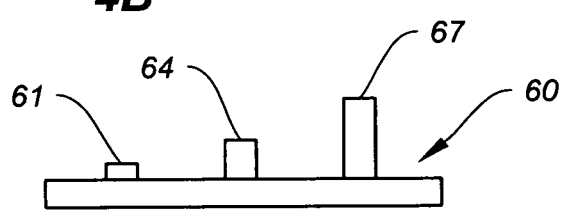

FIGS. 4A and 4B illustrates a calibration target 60 comprised of nine cylindrical spikes 61-69 arranged in a 3×3 pattern, with three rows of increasing height spikes 61-63 having the smallest height and spikes 67-69 having the greatest height. The relative brightness of reflections from spikes 67-69 is greater than that of reflections from spikes 64-66 and corresponds to a given height of a surface area of a pear or other produce item and the relative brightness of reflections from spikes 64-66 is greater than that from spikes 61-63. Calibration target 60 provides known reference brightness measurements and is utilized to assure that the relative brightnesses of reflections from produce surfaces corresponds to real world height measurements and coordinates. A projective calibration is used to calibrate the transform between the image position and grayscale (x,g) into world (x,z) coordinates. The down-conveyor scale is a fixed factor and is held constant by an encoder on the belt that ensures that a consistent number of profiles per millimeter are exposed by the sensor.

Figure 5:
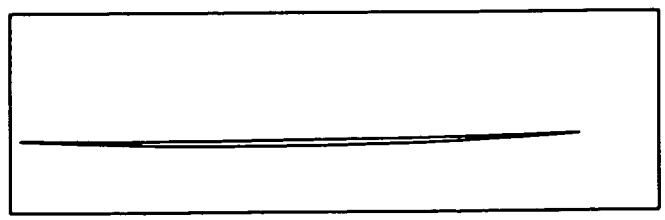
FIG. 5 illustrates radial lens distortion which is measured during calibration of the invention and compensated for during processing.

FIG. 5 illustrates how lens calibration is achieved for the system. A small amount of radial lens distortion is present for the "C" mount lens used in the system. This effect introduces a visible curvature (FIG. 5) to the perfectly straight laser sheet of light line when imaged, which must be measured during calibration and compensated during calibration and use.

The Hough Transform (modified) is used to detect the pears (or other produce item) in the depth map images of FIG. 3. The Hough Transform is described at E. R. Davies 'Machine Vision: Theory, Algorithms, Practice', Academic Press 1997, ISBN:0-12-206092-x incorporated herein by reference. The Hough Transform is modified by bypassing the usual edge detection stage and instead integrating all positive gradient information across the image. This turns the transform from a circle detector to a 'dome' detector when used with the depth image.

Application of the algorithm enhances any positive, approximately round domes in the image. The technique works well on all fruit tried. Peaks in the transformed image are detected via a threshold and blob analysis stage, their centroids are computed and then converted to world (x,y,z) coordinates using the calibration information. The application framework then passes this coordinate information to the labeling subsystem (or labeling machines).

Figure 6B:
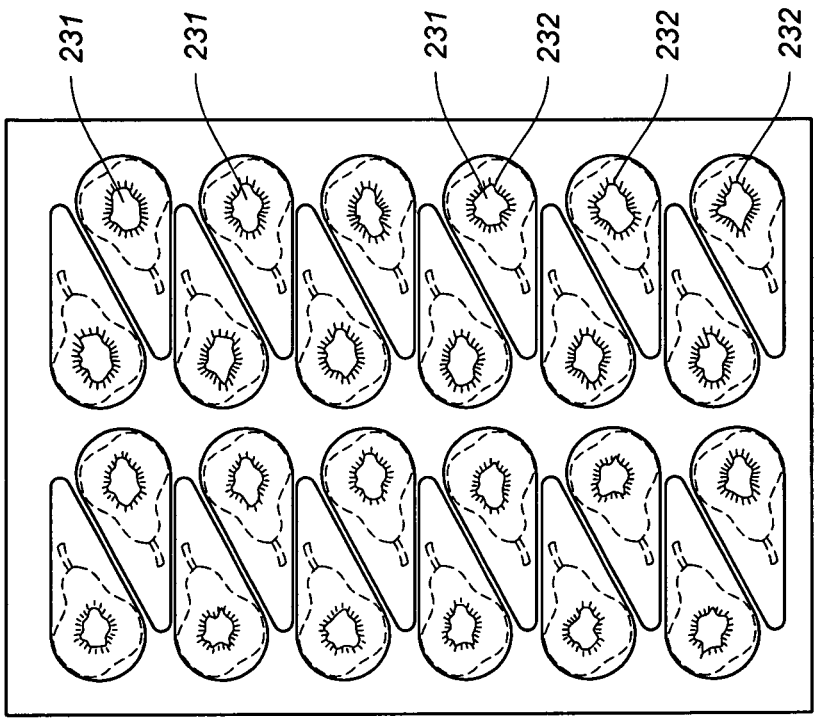
FIGS. 6A and 6B are "depth map" images before and after application of the "domes" algorithm, wherein FIG. 6B clearly locates the "dome" or highest point of the produce item.
Figure 6A:
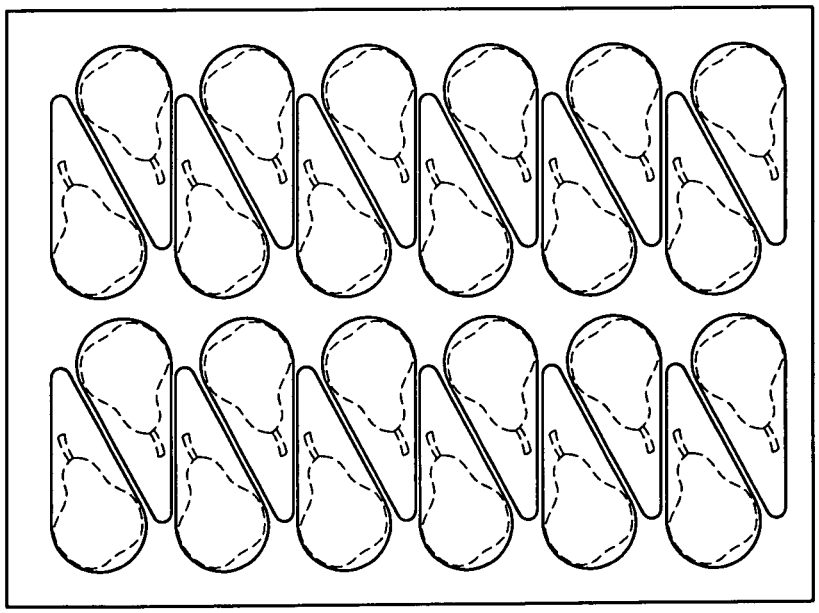

FIGS. 6A and 6B illustrate schematically the difference in image quality of a tray of pears before (FIG. 6A) and after (FIG. 6B) application of the modified Hough Transform. As shown in FIG. 6A, the pear images are relatively diffuse and without a clear indication of where the dome of each pear is located. FIG. 6B illustrates the domes as 231 generally. Accent marks 232 have been added to indicate the enhanced brightness of each dome 231 after the application of the modified Hough Transform. The coordinates of the enhanced dome images shown in FIG. 6B are passed to the labeling machines. In the preferred embodiment of the system, the horizontal or (x,y) coordinates are passed to the labeling machines along with the largest height or z coordinate in any given tray or array of produce items. A less preferred embodiment simply passes the horizontal or (x,y) coordinates to the labeling machines without any height or z coordinates. A further embodiment passes all height or z coordinates to the labeling machines.

The present invention may be used together with known labeling machines shown and described or referred to in U.S. Pat. Nos. 7,168,472 and 7,837,823, incorporated herein by reference. The present invention may also be used together with other known labeling machines available from Sinclair Systems International, LLC located at 3115 S. Willow Avenue, Fresno, Calif. 93725.

The foregoing description of the invention has been presented for purposes of illustration and description and is not intended to be exhaustive or to limit the invention to the precise forms disclosed. Modifications and variations are possible in light of the above teaching. For example, high intensity light sources capable of generating a sheet of light may be utilized instead of lasers. Such light sources include any light source capable of creating a sheet of light instantaneously and momentarily that generates a reflection similar to the sheet of light generated by laser profiling. The embodiments were chosen and described to best explain the principles of the invention and its practical application to thereby enable others skilled in the art to best use the invention in various embodiments and with various modifications suited to the particular use contemplated.

The invention claimed is:

1. A vision recognition method for use with a high speed, automatic produce labeling machine, wherein a conveyor feeds incoming produce items along an axis A-A toward said labeling machine, wherein each produce item has a dome portion of its surface which occurs at the greatest height of said produce item's surface above said conveyor, comprising the steps:
   generating a sheet of light from a laser source or other high intensity light source,
   directing said sheet of light transversely to said axis A-A of said conveyor,
   causing said sheet of light to periodically impact and reflect from the surfaces of said produce items to create instantaneous laser profiles of said surfaces,
   continuously imaging said laser profiles with a high speed camera locating the dome of each produce item by comparing the relative brightness of the reflections of said sheet of light from different portions of the surface of each produce item, and by identifying the portion of said surface that reflects the most light and shows the greatest relative brightness,
   creating real world coordinates (x,y) for the instantaneous location of said domes of said produce items horizontally on said conveyor, and
   transmitting said instantaneous real world horizontal (x,y) coordinates periodically to said labeling machine to provide advance data to said labeling machine regarding the real world horizontal location (x,y coordinates) of the dome of each incoming produce item to be labeled.

2. The method of claim 1 comprising the further step:
   creating a height or z coordinate for at least some of said domes by comparing the brightness of said reflection of light from said dome with known reference brightness measurements, and
   transmitting said height or z coordinates to said labeling machine.

3. The method of claim 2 comprising the further step:
   selecting the largest height or z coordinate from a selected number of said height or z coordinates, and
   transmitting said largest height or z coordinate to said labeling machine.

4. The method of claim 2 wherein said height or z coordinates are created for all of said domes and transmitted to said labeling machine.

5. The method of claim 1 wherein said different portions of said surface each form topographic rings showing the shape of the upper half of each said produce item.

6. The method of claim 1 comprising the further step:
   generating a 2-D map of said produce items from said laser profiles.

* * * * *